(12) United States Patent
Bruyère

(10) Patent No.: US 7,115,180 B2
(45) Date of Patent: Oct. 3, 2006

(54) PROCESS AND SYSTEM FOR FABRICATING A REINFORCING PREFORM

(75) Inventor: Alain Bruyère, Les Avenieres (FR)

(73) Assignee: Hexcel Reinforcements, Villeurbanne (FR)

(*) Notice: Subject to any disclaimer, the term of this patent is extended or adjusted under 35 U.S.C. 154(b) by 115 days.

(21) Appl. No.: 10/820,573

(22) Filed: Apr. 7, 2004

(65) Prior Publication Data

US 2005/0067731 A1  Mar. 31, 2005

(30) Foreign Application Priority Data

Apr. 17, 2003  (FR) ................... 03 04805

(51) Int. Cl.
*B65B 81/00* (2006.01)

(52) U.S. Cl. .................. 156/166; 156/173; 156/175; 156/441; 156/433

(58) Field of Classification Search ................ 156/166, 156/173, 175, 433, 441
See application file for complete search history.

(56) References Cited

U.S. PATENT DOCUMENTS

| | | | | |
|---|---|---|---|---|
| 4,410,385 A | * | 10/1983 | Murphy et al. | 156/181 |
| 4,539,249 A | * | 9/1985 | Curzio | 428/175 |
| 4,735,672 A | * | 4/1988 | Blad | 156/361 |
| 4,750,960 A | * | 6/1988 | Bubeck | 156/169 |
| 5,213,646 A | * | 5/1993 | Zsolnay et al. | 156/166 |
| 5,409,757 A | * | 4/1995 | Muzzy et al. | 428/114 |
| 5,447,586 A | * | 9/1995 | Tam | 156/64 |
| 5,518,564 A | * | 5/1996 | Darrieux | 156/93 |
| 2002/0162624 A1 | * | 11/2002 | Ebert et al. | 156/254 |
| 2003/0196743 A1 | * | 10/2003 | Borbone et al. | 156/180 |

FOREIGN PATENT DOCUMENTS

| | | |
|---|---|---|
| EP | 0 032 858 A1 | 7/1981 |
| EP | 0 193 380 A2 | 9/1986 |
| FR | 2 581 379 A1 | 11/1986 |
| GB | 2105247 A * | 3/1983 |
| WO | WO 98/17852 A1 | 4/1998 |

OTHER PUBLICATIONS

Cano, R.J.; et al, "Studies on Automated Manufacturing of High Performance Composites", American Helicopter Society Hampton Roads Chapter, Structure Specialists' Meeting, Williamsburg, VA, Oct. 3-Nov. 1, 2001.*

* cited by examiner

*Primary Examiner*—Jeff H. Aftergut
(74) *Attorney, Agent, or Firm*—W. Mark Bielawski; David J. Oldenkamp

(57) ABSTRACT

Process and system for fabricating a multidirectional fibrous reinforcement designed to be a porous preform for producing a part made of a composite material. Reinforcing thread is deposited in successive layers on a support surface. A binder is provided in association with the reinforcing thread so as to adhere the reinforcing thread to the support surface and the successive layers of thread. The reinforcing thread is pressed against the support surface in a manner that exerts a pressure substantially perpendicular to the support surface at the point where the thread is deposited. The binder may be pre-applied to the support surface or it can be applied simultaneously with the reinforcement thread.

19 Claims, 2 Drawing Sheets

PROCESS AND SYSTEM FOR FABRICATING A REINFORCING PREFORM

BACKGROUND OF THE INVENTION

1. Field of the Invention

The present invention concerns the technical area of fabricating preforms or multidirectional fibrous reinforcements designed for fabricating parts made of composite materials.

2. Description of Related Art

In that technical area it is known, specifically from patent application FR 2 581 379, starting with reinforcing threads, how to make a preform or multidirectional fibrous reinforcement designed to be resin-injected and become a part made of a composite material.

Patent application FR 2 581 379 proposed to make preforms for truncated conic or ellipsoid revolving parts, such as jet engine vents, by winding a reinforcing thread that has been pre-impregnated with a binding agent, on a support having teeth, designed to avoid any relative slippage of the thread on the support, so as to preserve a perfectly even distribution of the reinforcing thread on the fibrous reinforcement.

Using such a fabrication procedure, it is possible to make spoolable multidirectional fibrous reinforcements that are rotationally symmetrical. However, this fabrication process has the disadvantage of not permitting the fabrication of multidirectional fibrous reinforcements having complex or awkward forms, with no favored axis of rotational symmetry or, again, having locally concave areas, with regard to the general form of the fibrous reinforcement.

In addition, the process according to patent application FR 2 581 379 has the disadvantage of placing the reinforcing thread, while it is being laid down, in a state that could be described as pre-constraint or pre-stressed. The pre-constraint influences the mechanical behavior of the multidirectional fibrous reinforcement and can affect the performance of the part incorporating the fibrous reinforcement.

Also, because of the tension applied to the reinforcing thread, winding it requires a deposit path that necessarily corresponds geodesically to the support surface and thus limits the types of reinforcing structures that can be made.

Thus arises the need to have a new fabrication process available that permits preforms or multidirectional fibrous reinforcements to be made that can have complex or awkward forms, specifically with locally concave areas and specifically in these areas having reinforcing threads arranged in different directions.

SUMMARY OF THE INVENTION

In order to attain the above goal, the present invention concerns a fabrication process for a multidirectional fibrous reinforcement designed to be a porous preform for producing a part made of a composite material. The process involves depositing at least one reinforcing thread in successive layers on a support, associated with a binder, so as to ensure that the first layer adheres to the support surface and also that the successive layers are bonded to each other.

According to the invention, when the reinforcing thread is laid down, the fabrication process also consists in pressing the reinforcing thread against the support or against a previous layer by exercising pressure substantially perpendicular to the support surface at the point where the thread is laid down.

Using a binder associated with pressure on the thread when the thread is laid down allows the reinforcing thread or threads laid down to be very precisely positioned according to predefined curves that do not necessarily correspond to the geodesic lines of the support surface. Thus the process according to the invention allows preforms to be shaped on a level support or, again, preforms to be shaped on a conical support, depositing reinforcing threads around the circumference and according to the surface contours. Of course, the fabrication process according to the invention may be used for various other support forms.

According to another characteristic of the invention, the reinforcing thread will advance as it is deposited, so as not to cause any tension in the reinforcing thread and so as to lay it down in its state of repose.

This advantage of the invention allows a multidirectional fibrous reinforcement to be made that could be considered as having isotropic behavior or at the very least, as not having a favored direction of resistance caused by thread tension insofar as, according to this characteristic of the invention, the reinforcing threads laid down are free of any pre-constraint.

According to the invention, it is possible to use any type of binder compatible with the nature of the multidirectional fibrous reinforcement and with the treatment given the reinforcement, specifically during fabrication of the part made of a composite material.

According to a characteristic of the invention, the binder used is activated while the reinforcing thread is being deposited. In this case, the binder will then be first deposited either on the support or on the reinforcing thread.

According to another characteristic of the invention, the binder is instead deposited while the reinforcing thread is being deposited and ahead of the point where the reinforcing thread is being deposited.

According to the invention, the reinforcing thread may be deposited in any appropriate fashion, manually or even automatically.

According to a preferred characteristic, the reinforcing thread is deposited automatically or by means of a robot equipped with a deposit finger that has a presser head designed to exert pressure on the reinforcing thread and a thread guide groove leading to the presser head.

According to a preferred characteristic, but not strictly necessary for implementation, pressure perpendicular to the surface of the presser head is exerted on the deposit finger. In addition, the surface of the presser head is preferably kept tangent to the support surface while the reinforcing thread is being laid down.

Note that, according to the invention, one or more reinforcing threads may be laid down simultaneously according to parallel deposit trajectories. It may then be possible to use as many deposit fingers as there are reinforcing threads simultaneously deposited.

As previously stated, it is possible to use any appropriate type of binder.

According to one form of implementing the invention, a thermoplastic powder or a thermosetting powder or a mixture of the two is used as a binder. Among usable thermoplastic powders, the following may be cited as non-limiting examples: polyolefin, polyamide, and polyether sulfone powders, and among the thermosetting powders, epoxy resins with or without a hardening agent, phenol powders and polyester powders may be cited. The process then involves heating the area where the reinforcing thread is deposited. Heating may be achieved at the point of the deposit finger using a heater or a radiant heat source directed towards the area where the reinforcing thread is deposited.

Similarly, the powder indicated above may be used in different ways. The powder is either first associated with the reinforcing thread so that it at least partially covers the thread or instead, the powder is projected onto the support surface or onto the preceding layers of reinforcing threads while the reinforcing thread is being deposited.

According to the invention, it is also possible to use a support surface that has been first at least partially covered with a thermoplastic and/or thermosetting powder.

According to another characteristic of the invention, a resin may also be used as a binder wherein the resin has the same chemical qualities as the powders indicated above and used in a melted state called "hot melt." The hot-melt resin is then deposited on the support, then on the previous thread layers while the reinforcing thread is being laid down and ahead of the deposit of the reinforcing thread.

According to another characteristic of the invention, a thermoplastic thread may be used as a binder wherein the thermoplastic thread is wrapped around the reinforcing thread and then heated at the point of deposit. The thermoplastic thread may be of any appropriate kind, and examples may include, but are not limited to, polyamide, polyolefin, polyether sulfone, polyether ether acetone (PEEK) or polyether imide (PEI) thread.

According to another characteristic of the invention, a binder is used that is closely bound to the reinforcing thread to form a hybrid reinforcing thread. Thus it is possible to use thermoplastic filaments as a binder, that are of the same kind as the thermoplastic threads indicated above and that will be mixed with filaments made of reinforcing material, which mixture will be spun to form a hybrid reinforcing material.

According to another characteristic of the invention, a pulverizable solution or emulsion of at least one adhesive resin is used as a binder, such as, for example, but not limited to, a polyacrylic, polyvinyl or polyurethane resin.

According to the invention the reinforcing thread may be laid down continuously or in discontinuous segments.

According to the invention, depending on the type of reinforcing thread and binder used, 0.01–30 bar pressure, preferably 0.1–1 bar, will be applied to the reinforcing thread while it is being laid down.

Similarly, depending on the nature of the binder used and the reinforcing thread and, more particularly, if a thermoplastic or thermo-adhesive binder is used, the point of deposition of the reinforcing thread will be heated to a temperature of 50–450° C., preferably 50–150° C.

Naturally, the fabrication process according to the invention may use different types of reinforcing threads including but not limited to threads made of carbon, glass, polyester, aramid, metal or even mixtures of those materials.

In addition, the term "reinforcing thread" should be understood in the broad sense; it includes, for example, bundles or strands as well as braided threads.

The invention also concerns a preform comprising several layers of reinforcing threads arranged in at least two directions and made solid with a binder, characterized in that they are fabricated in accordance with the process according to the invention.

According to a preferred, but not strictly necessary characteristic of the invention, the reinforcing threads making up the porous preform are in a state of repose and not subject to any pre-constraint.

The invention also concerns a system for using the above fabrication process. Such a system includes the following:

a support with a surface having the shape of the fibrous reinforcement to be fabricated;

means for storing at least one reinforcing thread;

at least one deposit head that includes a means of guiding the reinforcing thread to the means of deposit, having a surface to press the reinforcing thread against the support surface;

means to guide the reinforcing thread from the means of storage to the deposit head;

means to move the deposit head; and means of commanding the means to move, adapted to ensure moving the deposit head in relation to the support surface so as to move the means of deposit against the support surface according to a predetermined trajectory, pressing the reinforcing thread against the support surface and maintaining the pressing surface tangent to the support surface so that the pressure exerted keeps a normal direction in relation to the support surface.

The means of deposit may be implemented in any appropriate manner. According to a preferred form, but not strictly necessary to implement, the means of deposit include at least one deposit finger having a presser head designed to exert pressure on the reinforcing thread against the support and a thread guide groove leading to the presser head.

According to another characteristic of the invention, also preferred but not strictly necessary, the system includes means to lead or advance the reinforcing thread as it is laid down so as not to cause any tension in the reinforcing thread.

According to yet another characteristic of the invention, the system also includes means to apply a binder.

Depending on the nature of the binder used, whether or not applied using the system, the system may also include means to activate the binder that can be implemented in any appropriate fashion. When using a thermoplastic or thermofusible binder, the means of activation include means for heating the deposit area and for pressing the reinforcing thread. The means for heating may be implemented in different ways such as, for example, in the form of a heater incorporated in the deposit finger or again in the form of a radiant source such as, for example, a source of infrared rays.

When using a binder resin that polymerizes under ultraviolet rays, the means of activation is a source of ultraviolet rays.

Various other characteristics of the process for fabricating the preform and the system necessary to implement the process can be seen in the description below referring to the attached drawings that illustrate one form, preferred but not limiting, for implementing a fabrication system in accordance with the invention, and also non-limiting examples of preforms fabricated according to the invention.

DETAILED DESCRIPTION OF THE INVENTION

Figure 1:
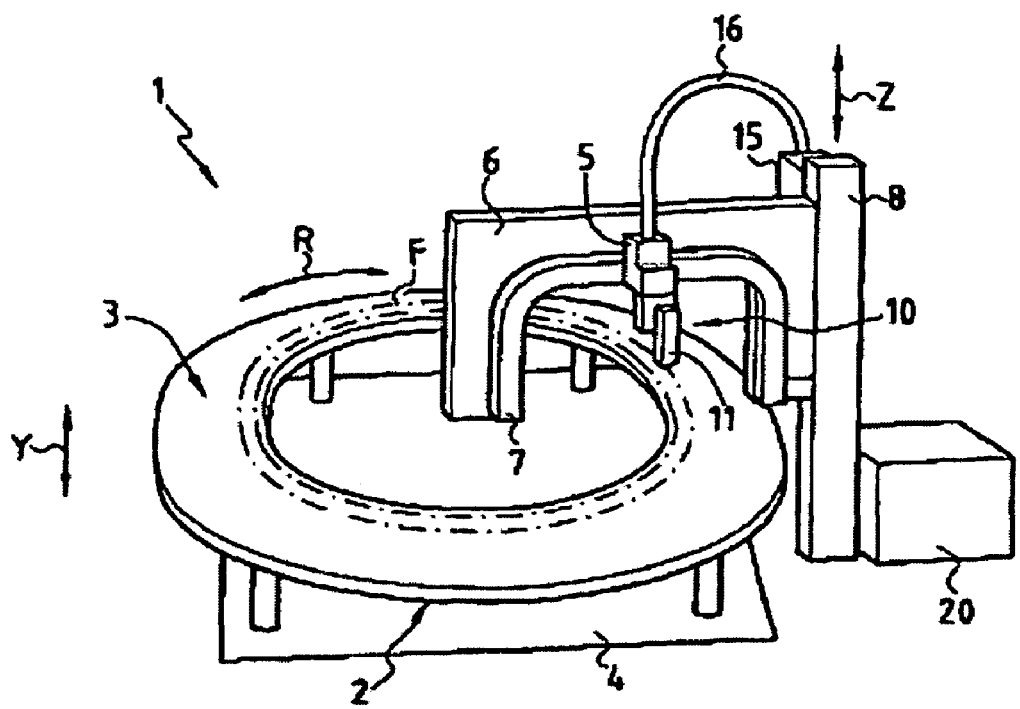
FIG. 1 is a general view of a system that is one example of a system for implementing the fabrication process according to the invention.

The invention aims to allow the fabrication of a multidirectional fibrous reinforcement that may have an awkward or complex tri-dimensional shape and designed to be a porous preform for producing a part made of a composite material, for example by injecting a resin in the porous preform, previously arranged in a mold.

The various techniques for fabricating parts of composite materials from porous preforms are amply known to a person skilled in the art and do not fall under the present invention. Thus it appears not necessary to describe them any further.

The invention aims to offer great freedom of form for making a multidirectional fibrous reinforcement in order to permit a large variety of applications. To that end, the invention purposes to use a system such as the one illustrated in FIG. 1 and designated generally at 1. The system 1 enables the automatic or semi-automatic implementation of the process according to the invention.

Thus, system 1 comprises a support 2, the support surface 3 of which may be considered as a male or female imprint depending on the application side of the reinforcing thread. In order to facilitate the operation of laying down reinforcing threads, support 2 is borne by a table 4, capable of being moved horizontally according to two orthogonal axes X and Y, and rotated R, again horizontally around a vertical axis.

In order to allow the reinforcing thread to be deposited on surface 3 according to the invention, the system 1 also includes at least one and according to the example illustrated, exactly one deposit head 5. In the system example illustrated, the deposit head 5 is mounted on a portal frame 6 that has a path 7 along which the head 5 may be moved.

So as to give additional degree of freedom of movement to the deposit head 5, the portal 6 is also supported by a column 8, along which the portal may be moved vertically in direction Z.

Note that the table 4, portal 6 and column 8 are equipped with appropriate means of automation and motorization constituting means of moving the deposit head 5 in relation to the surface 3 of the support.

Figure 2:
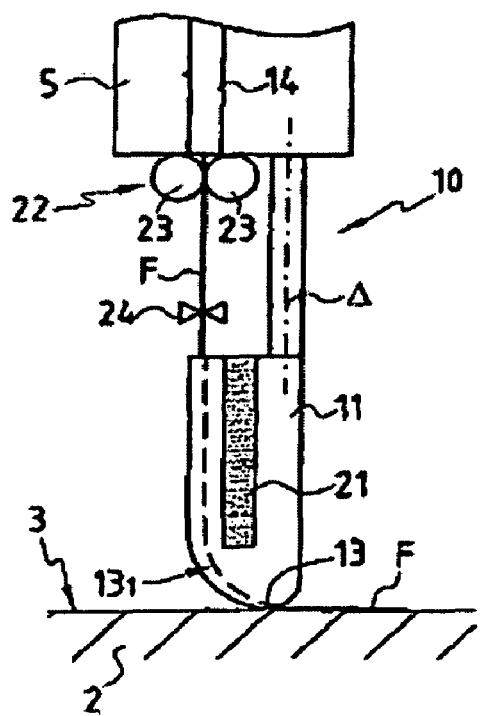
FIG. 2 is a detailed view of a means for laying down a reinforcing thread that is part of the system illustrated in FIG. 1.

So as to ensure, according to the invention, its purpose of laying down a reinforcing thread, the deposit head 5 includes a means of deposit 10, illustrated in more detail in FIG. 2.

According to the example illustrated, the means for deposit 10 are made up of a deposit finger 11 that at its end has a presser head 13, the surface of which is designed, as will be seen next, to press the reinforcing thread F against the surface 3 of the support 2. The finger also has a groove $13_1$, to guide the thread to the presser head 13. The deposit head 5 of course has a means to guide the reinforcing thread F to the finger 11, which can be implemented in any appropriate fashion, such as by grooves or tubes 14 through which the reinforcing thread F passes. According to the example illustrated, the deposit finger 11 rotates in relation to the head 5 around an axis Δ. Rotation around this axis is accomplished by motor means that are not shown. Furthermore, the finger 11 moves in relation to the head 5 along the axis Δ by motor means that are not shown, thus permitting the pressure of the presser head 13 on the surface 3 to be regulated.

Note that the system 1 also includes means for storing 15 the reinforcing thread F that may be implemented in any appropriate fashion such as, for example, in the form of a reel, not shown. The system 1 also includes means 16 for guiding the reinforcing thread from the means of storage 15 to the deposit head 5. The means for guiding 16 may be implemented in any appropriate manner, and according to the example illustrated, in the form of a flexible sheath, inside which the reinforcing thread F freely moves.

The fabrication system 1 also includes means 20 to command means of moving the head 5, means of moving the finger 11, and means of moving the support 2.

The means of command 20 are, for example, implemented in the form of a command unit or a programmable robot adapted to pilot the system so as to ensure the movement of the finger 11 against the support surface 3 and to deposit the thread F in accordance with the invention.

Figure 3:
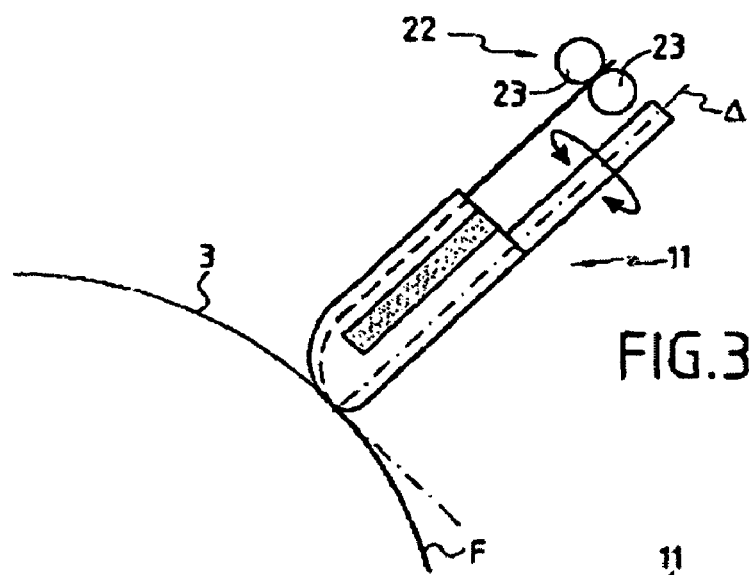
FIG. 3 is a view analogous to FIG. 2, showing the means of deposit in contact with a convex surface.

The means of command 20 ensure that the deposit head 5 will move in relation to the support surface 3 so as to move the means of deposit 10 against the support surface 3 according to a predetermined trajectory, pressing the reinforcing thread F against the support surface 3 and maintaining the pressing surface 13 tangent to the support surface 3 as shown in FIG. 3, so that the pressure exerted on the thread F has a normal direction in relation to the support surface 3.

According to the example illustrated, the reinforcing thread F is a thread that is at least in part covered with a thermoplastic powder and the deposit finger 11 then includes a heater 21 that permits the thermoplastic powder to be melted as the thread F is deposited, so as to cause the thread F to adhere first to the surface 3 of the support 2 on the first pass, then to the previous layer of threads in the succeeding passes.

According to a preferred characteristic of the invention, the deposit head 5 includes means 22 for leading or advancing the reinforcing thread. The means for leading 22 comprise, for example, a set of rollers 23 that grip the reinforcing thread and that are rotated by motor means (not shown). Rotation of the rollers 23 is governed by the command unit 20 so as to feed the finger 11 with a length of reinforcing thread F that substantially matches the length of the finger trajectory 11 on the surface 3, so that the reinforcing thread is deposited thereon without tension or pre-constraint.

Using the system as specifically illustrated in FIG. 1 permits, for example, the use of a preform to make an airplane window frame, for example. Note that in this case the reinforcing thread F, illustrated by dash/dot lines in FIG. 1, may be deposited in generally ovoid spirals on the same plane as the support plane on the first pass, then, in radial or centrifugal directions for the second pass, then again in spirals for the third pass, and so on, until the desired shape and thickness are obtained.

By modifying the dimensions of the different passes it is possible to free or modify the form of the final composite structure, at least partially, from the form of the deposit surface.

So that the reinforcing thread F may be deposited in independent or discontinuous segments, the means of deposit also include means 24 for cutting the thread F guided by the command unit 20.

Figure 4:
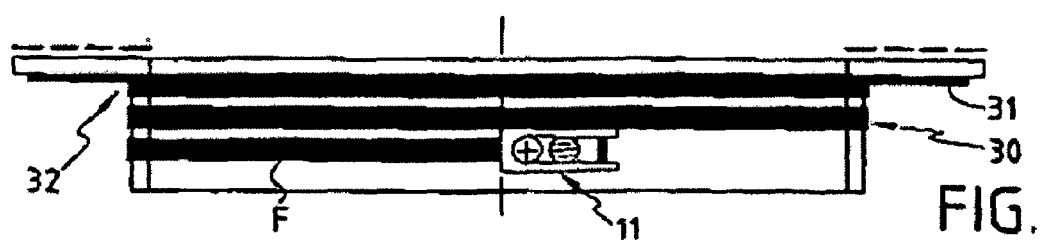
Figure 5:
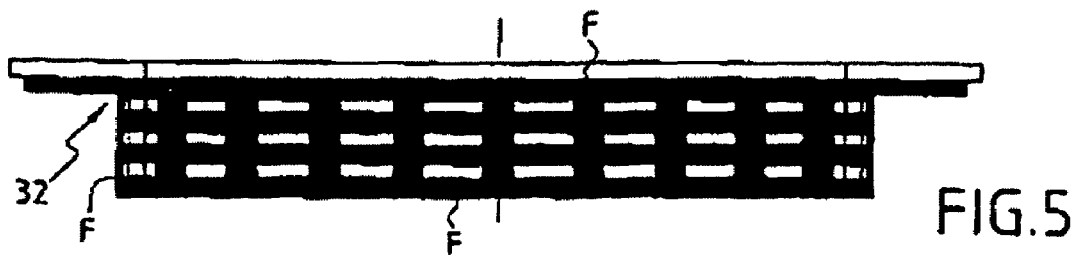

FIGS. 4 and 5 illustrate another example of implementing the process according to the invention, wherein the preform to be made must have a cylindrical body 30 with a flange 31. According to this example, the system and process according to the invention permit the thread to be deposited in successive layers in two perpendicular orientations, as shown comparatively in FIGS. 4 and 5. Note that the process and system according to the invention ensure that a reinforcing thread is deposited in accordance with a deposit trajectory contained on a radial plane in the reentering angle 32.

Figure 6:
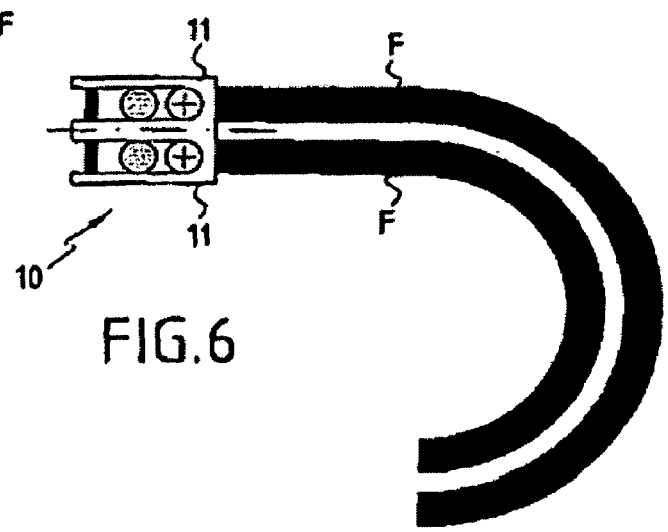
FIGS. 4–6 are views of different phases of fabricating a multidirectional fibrous reinforcement or preform in accordance with the process according to the invention.

FIG. 6 illustrates an example of the trajectory for simultaneously depositing two parallel reinforcing threads.

In addition, depending on the type of binder used to ensure that the first layer of threads bonds to the support surface and also that the layers of threads bond to each other, the deposit head may be equipped with different accessories.

Figure 7:
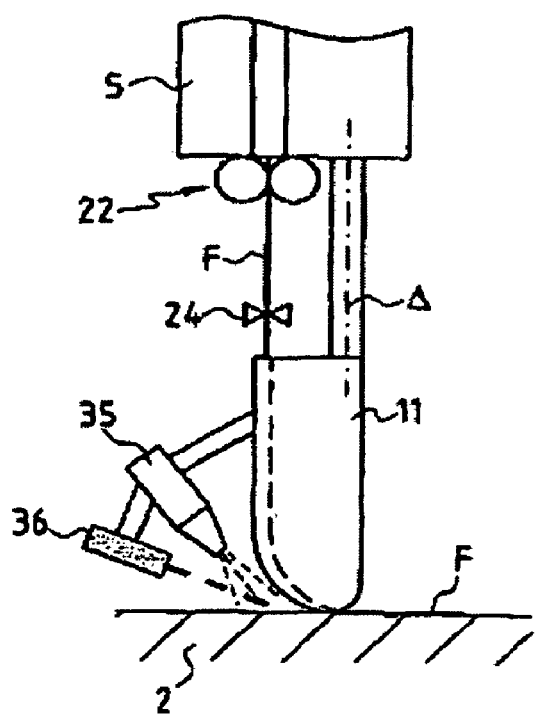
FIG. 7 illustrates a variant for implementing means of deposit suitable for equipping a system for implementing the fabrication process according to the invention.

FIG. 7 illustrates another type of implementation according to which the deposit finger 11 is equipped with means 35 for applying a binder such as, for example, a spray nozzle and means for activating 36, which in the present case is an ultraviolet ray source.

According to another implementation of the invention, the means of application 35 are a nozzle for depositing a hot-melt resin ahead of the support thread as the support thread is being deposited.

Naturally, various other means of depositing a binder may be envisaged, depending upon the binder used.

Similarly, the system according to the invention may be implemented in any other way and, for example, may use an automaton or robot with articulated arms.

Various other modifications may also be made to the invention without going beyond its scope as set forth in the following claims.

What is claimed is:

1. A process for fabricating a multidirectional fibrous reinforcement for use in producing a part made of a composite material, said process comprising the steps of:
   providing a deposition finger for use in a deposition step to deposit at least one reinforcing thread in at least two successive layers on a support surface wherein said deposition finger comprises a presser head that is shaped to exert pressure on said reinforcing thread, said deposition finger extending from a deposition head and being movable relative to said deposition head;
   providing a binder in association with said reinforcing thread so as to adhere said reinforcing thread to said support surface wherein said binder also provides a bond between said successive layers and wherein said binder is deposited on said support surface ahead of the reinforcing thread while the reinforcing thread is being deposited; and
   using said deposition finger to press said reinforcing thread against the support surface during said depositing step in a manner that exerts a pressure substantially perpendicular to said support surface at the point where the thread is deposited.

2. A process for fabricating a multidirectional fibrous reinforcement according to claim 1 wherein said reinforcing thread is advanced as the reinforcing thread is deposited so as not to cause any tension in said reinforcing thread and so as to deposit the thread without tension.

3. A process for fabricating a multidirectional fibrous reinforcement according to claim 1 wherein said step of providing said binder in association with said reinforcing thread comprises the step of activating said binder as the reinforcing thread is deposited.

4. A process for fabricating a multidirectional fibrous reinforcement according to claim 1 wherein said deposit finger comprises a thread guide groove for leading said reinforcing thread to the presser head.

5. A process for fabricating a multidirectional fibrous reinforcement according to claim 1 wherein said pressure is exerted perpendicular to the surface of the presser head on the deposit finger and wherein the surface of the presser head is kept substantially tangent to the support surface while the reinforcing thread is being deposited thereon.

6. A process for fabricating a multidirectional fibrous reinforcement according to claim 1 wherein said step of depositing reinforcing thread comprises using a plurality of deposition fingers to simultaneously deposit several reinforcing threads on said support surface in parallel deposit trajectories.

7. A process for fabricating a multidirectional fibrous reinforcement according to claim 1 wherein said binder comprises a thermoplastic powder and wherein the area where the reinforcing thread is to be deposited is heated.

8. A process for fabricating a multidirectional fibrous reinforcement according to claim 7 wherein said support surface is covered at least partially with a thermoplastic powder prior to deposition of said reinforcing thread thereon.

9. A process for fabricating a multidirectional fibrous reinforcement according to claim 1 wherein said binder comprises a hot-melt resin that is deposited on said support surface when said reinforcing thread is being deposited thereon and wherein said hot-melt resin is deposited ahead of the deposit of the reinforcing thread on said support surface.

10. A process for fabricating a multidirectional fibrous reinforcement according to claim 1 wherein said binder comprises a pulverizable solution or emulsion of at least one adhesive resin.

11. A process for fabricating a multidirectional fibrous reinforcement according to claim 1 wherein said reinforcing thread is deposited in discontinuing segments.

12. A process for fabricating a multidirectional fibrous reinforcement according to claim 1 wherein said support surface comprises an area having a concave or convex shape and wherein said reinforcing thread is deposited at least in said area of the support surface that has said concave or convex shape.

13. A process for fabricating a multidirectional fibrous reinforcement according to claim 1 wherein said pressure exerted against said reinforcing thread by said presser head is between 0.01 and 30 bar.

14. A process for fabricating a multidirectional fibrous reinforcement according to claim 1 wherein the location where the reinforcing thread is deposited on said support surface is heated to a temperature of between 50 and 450 °C.

15. A process for fabricating a multidirectional fibrous reinforcement according to claim 1 wherein said deposition finger includes a longitudinal axis which extends from said deposition head to said presser head and wherein said deposition finger is moved in relation to said deposition head during said deposition step by rotation about said longitudinal axis.

16. A process for fabricating a multidirectional fibrous reinforcement according to claim 15 wherein said deposition finger is extended and/or retracted along said longitudinal axis in relation to said deposition head during said deposition step.

17. A process for fabricating a multidirectional fibrous reinforcement according to claim 1 wherein said deposition finger includes a longitudinal axis which extends from said deposition head to said presser head and wherein said deposition finger is extended and/or retracted along said longitudinal axis in relation to said deposition head during said deposition step.

18. A process for fabricating a multidirectional fibrous reinforcement for use in producing a part made of a composite material, said process comprising the steps of:
providing a deposition finger for use in a deposition step to deposit at least one reinforcing thread in at least two successive layers on a support surface wherein said deposition finger comprises a presser head that is shaped to exert pressure on said reinforcing thread, said deposition finger extending from a deposition head and being movable relative to said deposition head;
providing a binder in association with said reinforcing thread so as to adhere said reinforcing thread to said support surface wherein said binder also provides a bond between said successive layers, said binder comprising a thermoplastic powder and wherein the area where the reinforcing thread is to be deposited is heated and wherein said thermoplastic powder is co-deposited onto said support surface with said reinforcing thread.

19. A process for fabricating a multidirectional fibrous reinforcement according to claim 18 wherein said reinforcing thread is covered at least partially with said thermoplastic powder.

\* \* \* \* \*